(12) United States Patent
Fertig et al.

(10) Patent No.: US 11,360,221 B2
(45) Date of Patent: Jun. 14, 2022

(54) DIRECT MEASUREMENT OF IMBALANCED OPTICAL PATHS USING ENTANGLED PHOTONS

(71) Applicant: Honeywell International Inc., Morris Plains, NJ (US)

(72) Inventors: Chad Fertig, Bloomington, MN (US); Karl D. Nelson, Plymouth, MN (US)

(73) Assignee: Honeywell International Inc., Charlotte, NC (US)

( * ) Notice: Subject to any disclaimer, the term of this patent is extended or adjusted under 35 U.S.C. 154(b) by 22 days.

(21) Appl. No.: 16/936,295

(22) Filed: Jul. 22, 2020

(65) Prior Publication Data

US 2022/0026586 A1 Jan. 27, 2022

(51) Int. Cl.
*H04B 10/70* (2013.01)
*G01S 19/48* (2010.01)
*B82Y 20/00* (2011.01)

(52) U.S. Cl.
CPC ............ *G01S 19/485* (2020.05); *B82Y 20/00* (2013.01); *H04B 10/70* (2013.01)

(58) Field of Classification Search
CPC ........ G02S 19/485; B82Y 20/00; H04B 10/70
USPC ....................................................... 398/140
See application file for complete search history.

(56) References Cited

U.S. PATENT DOCUMENTS

| 4,004,098 A | 1/1977 | Shimasaki |
| 5,475,520 A | 12/1995 | Wissinger |
| 6,590,685 B1 | 7/2003 | Mendenhall et al. |
| 7,286,444 B1 | 10/2007 | Bahder et al. |
| 7,324,211 B2 | 1/2008 | Tsujita |

(Continued)

FOREIGN PATENT DOCUMENTS

| CN | 104407321 A | 3/2015 |
| CN | 106848827 A | 6/2017 |

(Continued)

OTHER PUBLICATIONS

Fertig, Chad et al. "Integrated Photonics Source and Detector of Entangled Photons", U.S. Appl. No. 16/803,841, filed Feb. 27, 2020, pp. 1-34, Published: US.

(Continued)

*Primary Examiner* — Ted M Wang
(74) *Attorney, Agent, or Firm* — Fogg & Powers LLC (57) ABSTRACT

Systems and methods for direct measurement of imbalanced optical paths using entangled photons are provided. A system includes an optical source for generating a pair of simultaneously produced photons. The system also includes first and second emitter/receivers that emit first and second photons in the pair of simultaneously produced photons towards a first and second remote reflector and receives the reflected first and second photons along first and second optical paths. Further, the system includes a mode combiner for combining the reflected first and second photons into first and second output ports. Moreover, the system includes photodetectors that detect photons from the first and second output ports. Also, the system includes a processor that measures a difference in time delay between the first and second optical paths based on a time difference of arrival of signals from the photodetectors.

18 Claims, 7 Drawing Sheets

(56) References Cited

U.S. PATENT DOCUMENTS

| | | | | |
|---|---|---|---|---|
| 7,359,064 | B1* | 4/2008 | Bahder | G01B 11/002 356/496 |
| 9,784,561 | B2 | 10/2017 | Jiang et al. | |
| 10,187,162 | B2 | 1/2019 | Li et al. | |
| 2005/0199812 | A1 | 9/2005 | Shih | |
| 2009/0134310 | A1 | 5/2009 | Goodno | |
| 2009/0290162 | A1 | 11/2009 | Erkmen et al. | |
| 2010/0123091 | A1 | 5/2010 | Gilbert et al. | |
| 2013/0176573 | A1 | 7/2013 | Bovino | |
| 2015/0055961 | A1* | 2/2015 | Meyers | H04B 10/70 398/140 |
| 2015/0077734 | A1* | 3/2015 | Habif | G01S 17/18 356/5.03 |
| 2019/0349094 | A1 | 11/2019 | Santra et al. | |
| 2020/0382219 | A1 | 12/2020 | Innes et al. | |

FOREIGN PATENT DOCUMENTS

| | | |
|---|---|---|
| CN | 109547144 A | 3/2019 |
| CN | 109586907 A | 4/2019 |
| CN | 209170391 U | 7/2019 |
| WO | 2020140850 A1 | 7/2020 |

OTHER PUBLICATIONS

Hayat et al., "Theory of photon coincidence statistics in photon-correlated beams", Optics Communications 6067, Sep. 7, 1999, pp. 1-13, Elsevier Science B.V.

Puckett, Matthew W et al. "Integrated Photonics Mode Splitter and Converter", U.S. Appl. No. 16/803,820, filed Feb. 27, 2020, pp. 1-31, Published: US.

Puckett, Matthew W. et al. "Integrated Photonics Vertical Coupler", U.S. Appl. No. 16/803,831, filed Feb. 27, 2020, pp. 1-31, Published: US.

U.S. Patent and Trademark Office, "Notice of Allowance", U.S. Appl. No. 16/936,282, filed Jul. 28, 2021, pp. 1 through 19, Published: US.

Kim et al., "Two-photon interference of polarization-entangled photons in a Franson interferometer", Scientific Reports, 7, 5772, Jul. 18, 2007, pp. 1 through 13.

Lyons et al., "Attosecond-resolution Hong-Ou-Mandel interferometry", Scientific Advances, 2018:4, May 4, 2018, pp. 1 through 8, Optics.

U.S. Patent and Trademark Office, "Office Action", U.S. Appl. No. 16/936,294, filed Jun. 23, 2021, pp. 1 through 23, Published: US.

U.S. Patent and Trademark Office, "Notice of Allowance", U.S. Appl. No. 16/936,282, Nov. 12, 2021, pp. 1 through 12, Published: US.

U.S. Patent and Trademark Office, "Notice of Allowance", U.S. Appl. No. 16/936,294, filed Oct. 22, 2021, pp. 1 through 12, Published: US.

Aguilar et al., "Robust interferometric sensing using two-photon interference", Jul. 10, 2020, pp. 1 through 10.

European Patent Office, "Extended European Search Report from U.S. Appl. No. 16/936,294, filed Sep. 27, 2021", from Foreign Counterpart to U.S. Appl. No. 16/936,294, filed Sep. 27, 2021, pp. 1 through 8, Published: EP.

Quan et al. "Demonslialion of quantum synchronization based on second-order quantum coherence of entangled photons", Scientific Reports, Jul. 25, 2016, pp. 1 through 8, www.nature.com/scientificreports.

Valencia et al. "Distant clock synchronization using entangled photon pairs", Applied Physics Letters, Sep. 27, 2004, pp. 2655 through 2657, vol. 85, No. 13, American Institute of Physics.

European Patent Office, "Extended European Search Report from U.S. Appl. No. 16/936,295, filed Sep. 28, 2021", from Foreign Counterpart to U.S. Appl. No. 16/936,295, filed Sep. 28, 2021, pp. 1 through 8, Published: EP.

Fertig, Chad et al., "Dynamic Optical Interferometer Locking Using Entangled Photons", U.S. Appl. No. 16/936,294, filed Jul. 22, 2020, pp. 1 through 43, Published: US.

Fertig, Chad et al., "Dynamical Locking of Optical Path Times Using Entangled Photons", U.S. Appl. No. 16/936,282, filed Jul. 22, 2020, pp. 1 through 50, Published: US.

* cited by examiner

DIRECT MEASUREMENT OF IMBALANCED OPTICAL PATHS USING ENTANGLED PHOTONS

STATEMENT REGARDING FEDERALLY SPONSORED RESEARCH OR DEVELOPMENT

This invention was made with Government support under 15-C-0285. The Government has certain rights in the invention.

BACKGROUND

Satellites orbiting the earth may communicate with one another to synchronize the clocks onboard the different satellites. Frequently, for precise clock synchronization, satellites may use interferometric methods to establish the relative locations of the satellites. Satellites often use the relative locations of satellites and atomic clocks to provide accurate time and frequency standards. The atomic clocks are used for the distribution of international time, to control the frequencies of broadcasted signals, and in global navigation satellite systems (GNSS) such as the global positioning system (GPS), GLONASS, BeiDou, or Galileo. In some satellite constellations, the relative position of satellites may not be knowable to a precision that permits the synchronization of the atomic clocks to the desired levels.

SUMMARY

Systems and methods for direct measurement of imbalanced optical paths using entangled photons are provided. A system includes an optical source for generating a pair of simultaneously produced photons. The system also includes a first emitter/receiver that emits a first photon in the pair of photons towards a first remote reflector and receives the first photon reflected by the first remote reflector, the first photon traveling along a first optical path. Additionally, the system includes a second emitter/receiver that emits a second photon in the pair of photons towards a second remote reflector and receives the second photon reflected by the second remote reflector, the second photon traveling along a second optical path. Further, the system includes a mode combiner for combining the reflected first photon and the reflected second photon into a first output port and a second output port. Moreover, the system includes a plurality of photodetectors that detect photons from the first output port and photons from the second output port. Also, the system includes a processor that executes executable code that causes the processor to measure a difference in time delay between the first optical path and the second optical path based on a time difference of arrival of signals from the plurality of photodetectors.

DRAWINGS

Understanding that the drawings depict only some embodiments and are not, therefore, to be considered limiting in scope, the exemplary embodiments will be described with additional specificity and detail using the accompanying drawings, in which.

Per common practice, the various described features are not drawn to scale but are drawn to emphasize specific features relevant to the example embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made.

Systems and methods for directly measuring imbalanced optical paths using entangled photons are described herein. In certain embodiments, a system produces two "twin" photons that are "born" at nearly the same instant. The twin-photons may be used to effect a real-time lock of two optical pathlengths between a central optical source and two remote locations (for example, between a source satellite and two remotely located satellites). The source may acquire a lock by projecting the twin-photons towards reflectors at the remote locations. The source may receive the reflected photons and recombine them within a Hong-Ou-Mandel (HOM) interferometer. Computational devices connected to the interferometer may directly measure differences in the arrival times of the twin photons due to imbalanced optical paths. The source may use the direct measurement to adjust optical paths to facilitate the balancing of the optical paths.

In some systems, two photodetectors may simultaneously receive the twin photons and provide electrical signals to the timing module for comparison of their time of arrival. If the two photons are simultaneously received at the photodetectors, the timing module may record a vanishing in the rate of coincident detections of one photon on each photodetector. Alternatively, if the twin photons are received at the photodetectors at different times, the timing module may observe a measurable rate of coincident detections of the twin photons. Computation devices in some systems may identify the vanishing in the rate of coincident detections to synchronize the optical path links between a source and two remote locations.

Frequently, the delays between remote locations and a source location are largely unknown, and the difference between the distances between the different satellites may be largely unknown. In these situations, identifying the dip caused by the simultaneous arrival of twin photons may be particularly challenging. For example, the width of the dip may have a sub-picosecond width, and the unknown ranging distance may be comparatively large (>10-100 m). A system may account for a wide range of delays by monitoring a continuously acquired stream of time-tagged photon detections to directly measure large path differences (potentially greater than hundreds of meters) through analysis of time-delay histograms for two detectors of an interferometer.

In some embodiments, after measuring the path differences in flight times, the system may add a delay in the path having the shorter flight time. As such, the system may identify differences in the paths of the photons without utilizing the quantum interference of the twin photons. Also, the system may identify the difference in the paths without precisely measuring the individual flight times of the photons. After adding a delay, other systems may be able to finally adjust the difference in flight times if the flight times are still not balanced within the desired precision. Further, the system may monitor the path lengths and make adjustments as needed to maintain the synchronization of the different clocks.

Figure 1:
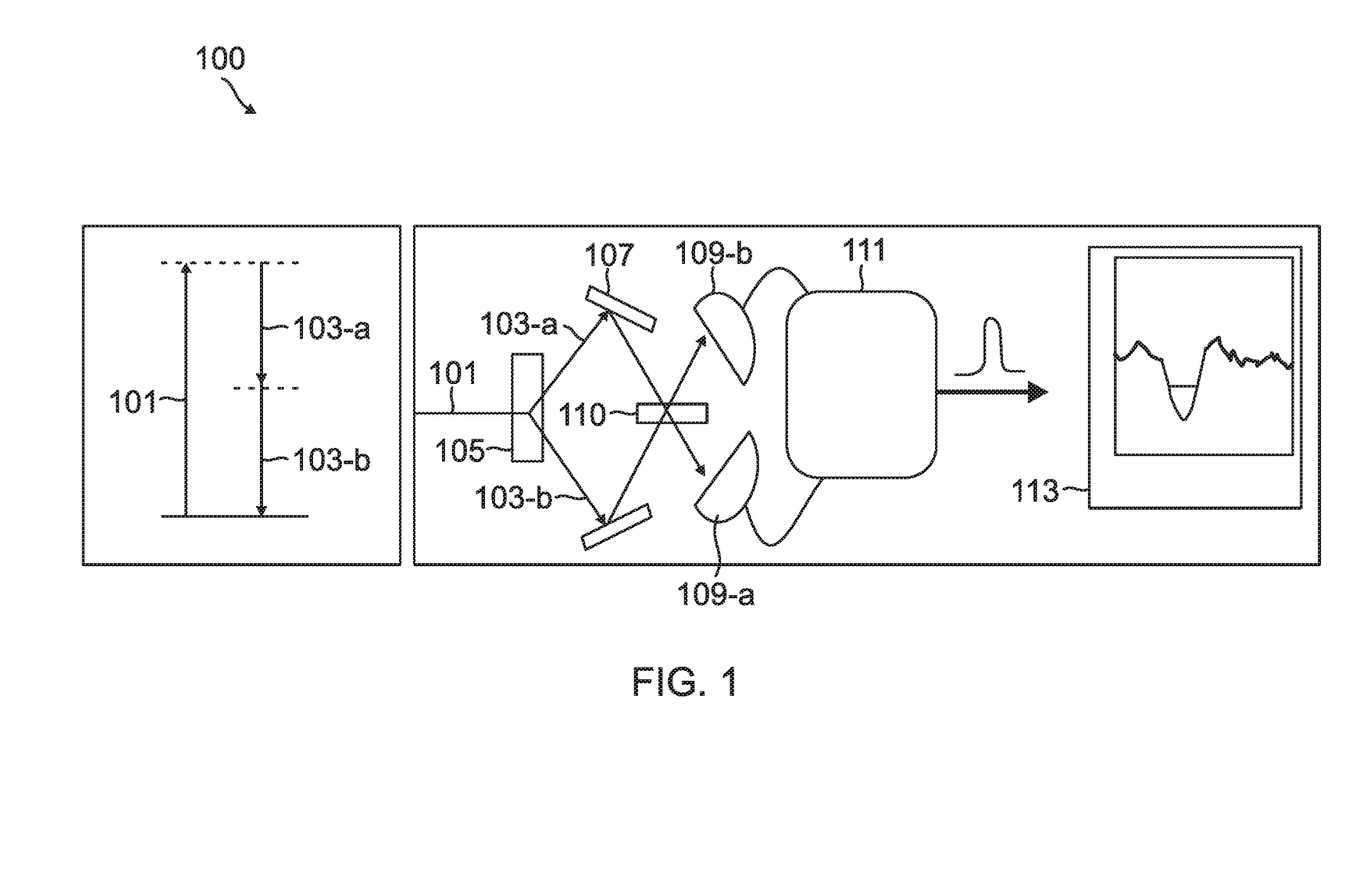
FIG. 1 is a diagram illustrating an exemplary interferometer according to an aspect of the present disclosure.

FIG. 1 is a diagram illustrating a system 100 for a Hong-Ou-Mandel (HOM) interferometer. Systems described herein may incorporate a HOM interferometer. As used herein, a HOM interferometer is a device that uses the HOM effect to measure characteristics for two received photons. The system 100 may produce a pump photon 101. The system 100 may split the pump photon 101 into two twin photons 103 (referred to separately herein as photons 103-A and 103-B). For example, the pump photon 101 may be produced by a laser source that produces photons having wavelengths of 405 nm or other potential wavelengths.

In certain embodiments, the pump photon 101 is split into twin photons 103 that are guided through optical structures for recombination. For example, the pump photon 101 is split by optical structure 105 into twin photons 103-a and 103-b. The twin photons 103-a and 103-b may each have a wavelength that is twice the wavelength of the pump photon 101 (i.e., where the pump photon could have a wavelength of 405 nm, the twin photons 103-a and 103-b may each have a wavelength of 810 nm). Additionally, the system 100 may include guiding optics 107 that guide the twin photons 103-a and 103-b to detectors 109 for the reception of the twin photons 103-a and 103-b. For example, a detector 109-a may receive and detect the twin photon 103-a, and the detector 109-b may receive and detect the twin photon 103-b.

In some embodiments, when the detectors 109 receive the associated twin photons 103, the detectors 109 may provide the signals to timing module 111, where the timing module 111 compares the times of arrival of the electrical signals, to determine the degree of coincidence of arrival. The timing module 111 may attempt to identify a delay that can be inserted into one or both of the optical paths to cause the coincidence rate of the signals provided by the photodetectors to dip towards zero. For example, the coincidence rate of the signals provided by the photodetectors may drop towards zero when the photodetectors detect the twin photons 103 at substantially the same time. This drop towards zero is known as the HOM dip illustrated in the trace graph 113. The dip occurs when the two twin photons 103 are substantially identical in all properties and recombine at the splitter 110. When the photons become distinguishable, the HOM dip disappears.

The system 100 and other systems described herein may be used within larger systems for synchronizing atomic clocks. For example, HOM interferometry may provide a femtosecond-precise time base that is distributed securely across a constellation of LEO or MEO satellites. One advantage of the systems and devices disclosed herein is the use of arrays of phase synchronized receivers. Phase synchronized receivers distributed over a large area may improve the resolution of images acquired by the satellites by creating a large aperture out of the dispersed collection of smaller apertures, thereby beating the diffraction limit of the individual smaller apertures. The ultra-high-resolution imaging could support a variety of missions ranging from sparse aperture imaging to geolocation to ground moving target indication. An additional advantage of the system includes real-time computational interferometry. For example, return signals may be synthesized during acquisition and can achieve a better signal-to-noise ratio on images than can post-collection averaging. Further advantages may include active beamforming, where a power of a pulse may be concentrated into an area smaller than could be achieved with the angular resolution of any one satellite's antenna. Active beamforming would not only boost the signal-to-noise ratio of the returned signals but also would reduce signal spillover and time-on-target, thus increasing the covertness of implementing processes. Also, arrays of receivers are more resilient to single-point attacks and can be configured to be optimized for different, specific mission profiles.

As described above, the identification of a HOM dip and synchronization of different satellites using HOM interferometry has many different applications. However, these applications may be dependent upon balancing the different optical paths of the interferometer to within the sub-millimeter scale. Balancing the different optical paths of remotely located satellites to high levels of precision may be difficult, especially when the paths are different by significant distances. Systems and methods described herein implement adjustments to the optical paths between the different satellites (or other remotely located devices) to facilitate the balancing of optical paths.

Figure 2:
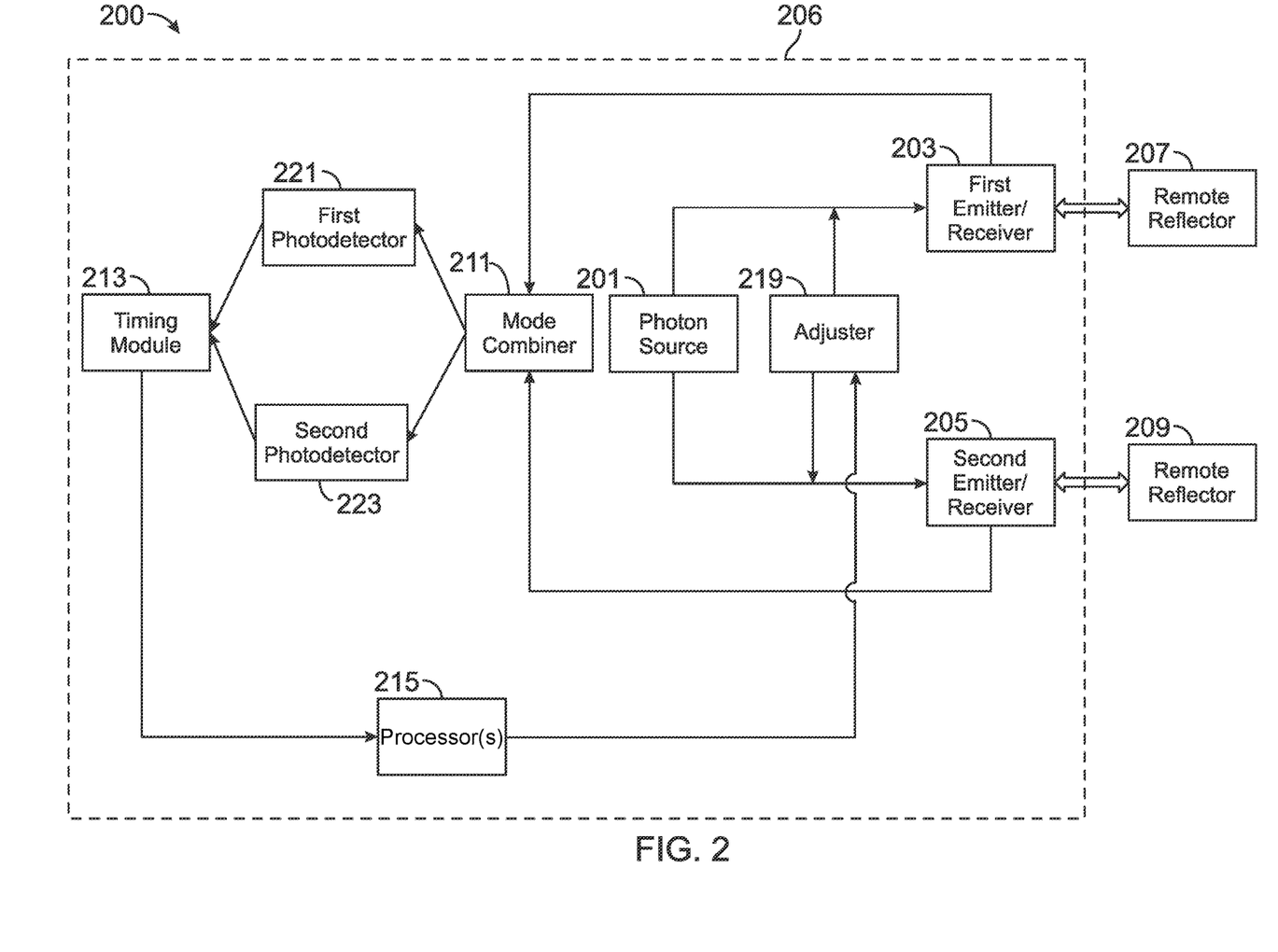
FIG. 2 is a block diagram illustrating an exemplary system for dynamic optical interferometer locking using entangled photons according to an aspect of the present disclosure.

FIG. 2 is a block diagram of a balancing system 200. The balancing system 200 may use various components to balance different optical paths between an optical source and receiver 206 and separate remote reflectors 207 and 209. Additionally, the balancing system 200 may be part of a balancing network that can synchronize time between multiple sources. Balancing networks are described in greater detail below. The optical source and receiver 206 may emit a first twin photon towards the remote reflector 207 and a second twin photon towards the remote reflector 209. In certain networks, the optical source and receiver 206 may be a satellite, and the remote reflectors 207 and 209 may be different remotely located satellites. Alternatively, the optical source and receiver 206 may be a device capable of emitting twin photons, and the remote reflectors 207 and 209 may be separate devices capable of receiving the twin photons and reflecting them towards the optical source and receiver 206.

In certain embodiments, the optical source and receiver 206 may include a photon source 201. The photon source 201 may be a device that generates a photon and splits the photon into two twin photons. The photon source 201 may be a laser generating device or other devices capable of generating the twin photons. For example, the photon source 201 may produce correlated or entangled photon pairs using spontaneous parametric down-conversion (SPDC). When the photon source 201 generates the twin photons, the photon source may provide a first twin photon to a first emitter/receiver 203 and a second twin photon to a second emitter/receiver 205. The first emitter/receiver 203 and the second emitter/receiver 205 may be devices that emit and receive photons. For example, an emitter/receiver may be a combination of optical devices that can focus and direct a photon towards a respective remote reflector and also receive a photon reflected from the respective remote reflector. For example, the first emitter/receiver 203 may emit a photon towards the remote reflector 207. Also, when the remote reflector 207 reflects the photon towards the optical source and receiver 206, the first emitter/receiver 203 may receive the reflected photon. Similarly, the second emitter/receiver 205 may emit a photon towards the remote reflector 209. Also, when the remote reflector 209 reflects the photon towards the optical source and receiver 206, the second emitter/receiver 205 may receive the reflected photon.

In some embodiments, when the first emitter/receiver 203 receives a first twin photon that was reflected from the remote reflector 207 and the second emitter/receiver 205 receives a second twin photon that was reflected from the remote reflector 209, the first emitter/receiver 203 and the second emitter/receiver 205 may provide the received twin photons to a mode combiner 211. In certain implementations, the first emitter/receiver 203 and the second emitter/receiver 205 may function as multiple devices, where photons are emitted by a first type of device and received by a second type of device. Alternatively, the first emitter/receiver 203 and the second emitter/receiver 205 may include a device (like a circulator) that receives the respective photons for emission on a first port, emits the photon towards and receives the photon from a remote reflector on a second port, and provides the received photon to the mode combiner 211 on a third port.

In some embodiments, the mode combiner 211 may include multiple outputs directed onto photodetectors 221 and 223. The photodetectors may convert the received light into electrical signals and provide the electrical signals to a timing module 213. The timing module 213, similar to the timing module 111 in FIG. 1, may combine the received electrical signal and perform interferometry on the received electrical signals. The timing module 213 may then provide data representing the results of the coincidence of the arrival of electric signals to the timing module 213 within the optical source and receiver 206.

In further embodiments, the timing module 213 may be a device that can acquire timing information from the interference data. As described herein, timing information may refer to information describing differences in the time from when a first twin photon is incident upon the first photodetector 221, and a second twin photon is incident upon a second photodetector 223. Additionally, the timing information may refer to information regarding the coincidence rate of the twin photons upon the respective photodetectors. The timing module 213 may provide the acquired timing information to a processor 215. In some embodiments, the timing module 213 may be a function executed on the processor 215. In other embodiments, the timing module 213 may be implemented on a separate computation device from the processor 215.

In certain embodiments, the processor 215 may use the timing information from the timing module 213 to identify a delay based on the difference in time of incidence of the twin photons. Using the identified delay, the processor 215 may determine adjustments to be made to the path length between the photon source 201 and one or both of the first emitter/receiver 203 and the second emitter/receiver 205 such that the path length between the photon source 201 and the remote reflector 207 and the path length between the photon source 201 and the remote reflector 209 are substantially equal. As used herein, the different optical paths are substantially equal when the coincidence rate of the detections of the twin photons at the first photodetector 221 and the second photodetector 223 dips towards zero, as described above concerning the HOM dip.

In some embodiments, the difference in path length between the photon source 201 and the respective remote reflector 207 and the remote reflector 209 may be substantially larger (>10 m-100 m) than the largest difference in path length for which the paths are substantially equal respecting the HOM dip, such as widths in the sub-millimeter range. Accordingly, to achieve precise equalization of path lengths for a wide range in initial path length differences, the processor 215 may adjust the path lengths to facilitate fine adjustments. In particular, the processor 215 may determine adjustments that control actuators in an adjuster 219. The adjuster 219 may be a device capable of making large changes to the different optical paths to facilitate small changes to the different optical paths. When the processor 215 determines that the difference is substantially large between the optical path lengths, the processor 215 may control the adjuster 219 to change the optical paths such that the difference between the optical path lengths is within a fine adjustment range.

Additionally, once the processor 215 has controlled the adjuster 219 to bring the difference between the optical path lengths within a fine adjustment range, the processor 215 may monitor the coincidence rate observed by the mode combiner 211 to monitor and adjust the different optical path lengths to account for movement in the remote reflectors 207 and 209, with respect to one another, and the optical source and receiver 206. For example, if the coincidence rate observed by the mode combiner 211 moves out of the fine adjustment range, the processor 215 may direct the adjuster 219 to adjust one or more of the optical path lengths, such that that the path length difference is within a fine adjustment range.

The processor 215 and/or other computational devices used in the optical source and receiver 206 or other systems and methods described herein may be implemented using software, firmware, hardware, or appropriate combination thereof. The processor 215 and other computational devices may be supplemented by, or incorporated in, specially-designed application-specific integrated circuits (ASICs) or field programmable gate arrays (FPGAs). The processor 215 and other computational devices can also include or function with software programs, firmware, or other computer-readable instructions for carrying out various process tasks, calculations, and control functions used in the methods and systems described herein.

The methods described herein may be implemented by computer-executable instructions, such as program modules or components, which are executed by at least one processor, such as the processor 215. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer-readable instructions. These instructions are typically stored on appropriate computer program products that include computer-readable media used for storing computer-readable instructions or data structures. Such a computer-readable medium may be available media that can be accessed by a general-purpose or special-purpose computer, processor, or other programmable logic device.

Suitable computer-readable storage media may include, for example, non-volatile memory devices including semiconductor memory devices such as Random Access Memory (RAM), Read Only Memory (ROM), Electrically Erasable Programmable ROM (EEPROM), or flash memory devices; magnetic disks such as internal hard disks or removable disks; optical storage devices such as compact discs (CDs), digital versatile discs (DVDs), Blu-ray discs; or any other media that can be used to carry or store desired program code in the form of computer-executable instructions or data structures.

As described above, the optical source and receiver 206 may capably adjust the different path lengths between the photon source 201 and the different remote reflectors 207 and 209 associated with the twin photons produced by the photon source such that the different path lengths are substantially equal enough to allow fine adjustments. Additionally, the optical source and receiver 206 may adjust the different path lengths to account for the movement of the remote reflectors 207 and 209 relative to the photon source 201. Accordingly, the optical source and receiver 206 may be used to synchronize the operations of different satellites associated with the photon source 201 and the remote reflectors 207 and 209 with high precision.

Figure 3:
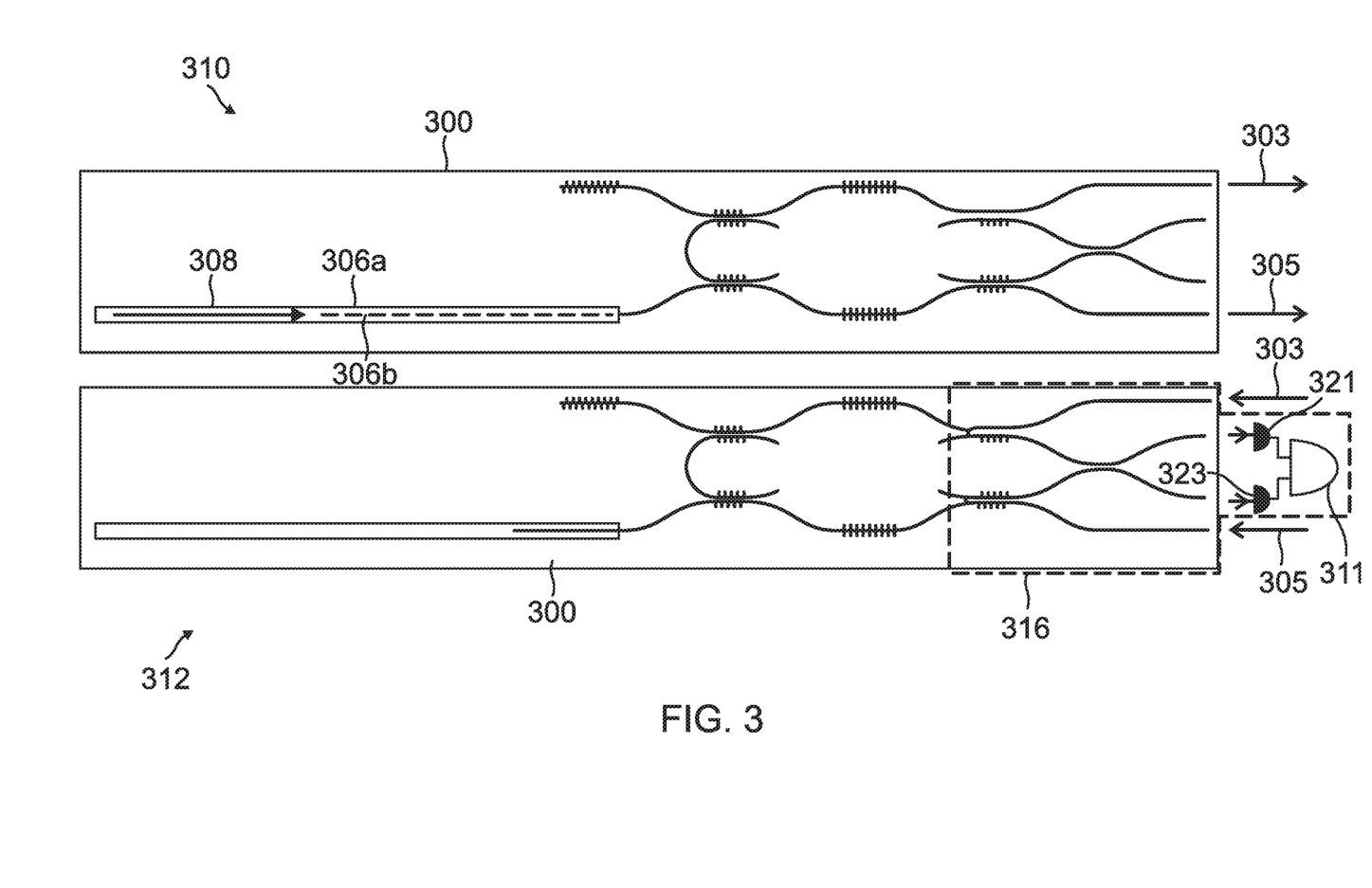
FIG. 3 is a diagram illustrating different paths in a chip-scale device according to an aspect of the present disclosure.

FIG. 3 illustrates different paths of photons through a chip-scale device 300 that is both capable of generating a photon, splitting the photon into twin photons, providing the twin photons to remote reflectors, receiving the photons from the remote reflectors, and providing the received photons to an interferometer for performing HOM interferometry. Accordingly, the chip-scale device 300 illustrates one embodiment of a chip-scale device 300 containing certain components of the optical source and receiver 206 described above in FIG. 2. In particular, the photon source 201 and other components shown in FIG. 3 facilitate the emission and reception of photons to the remote reflectors 207 and 209, the delivery of received photons to the mode combiner 211, the delivery of output ports from the mode combiner 211 to photodetectors 321 and 323, and the delivery of electrical signals to a timing module 311. While the components are shown as being part of a chip-scale device, the components may likewise be implemented using separate components that are coupled to one another using optical transmission media.

As shown, FIG. 3 illustrates a source path 310 and an interferometer path 312 through the chip-scale device 300. In the source path 310, a photon is generated and split into twin photons 303 and 305 for use by different remote reflectors. In the interferometer path 312, the twin photons 303 and 305 are received from the remote reflectors and provided to the timing module 311.

In certain embodiments, the chip-scale device 300 utilizes the nonlinear optical effect of degenerate spontaneous parametric down-conversion (dSPDC), in which a pump photon 308 splits into two "twin" photons 306A and 306B that are "born" at nearly the same instant (e.g., within <100 femtoseconds of one another). This simultaneity, enforced by quantum mechanics, may be exploited for synchronizing separated atomic clocks. To synchronize the separated atomic clocks (i.e., when the different atomic clocks are located on different satellites or associated with other types of remote reflectors), the synchronization is achieved by projecting twin photons 303 and 305 from the chip-scale device 300, reflecting some of the photons 303 and 305 from each of the remote reflectors, and providing them for recombination in a Hong-Ou-Mandel (HOM) interferometer, where a purely quantum mechanical interference "dip" in the coincidence rate is observed when the paths are substantially equal as described above with respect to FIGS. 1-2. The arrival times of some of the entangled photons from each satellite are correlated over a classical channel, enabling the clocks to be synchronized with high precision (i.e., potentially with femtosecond precision).

In some embodiments, the chip-scale device 300 is a chip-scale photonic integrated circuit that produces and interferes time-entangled photons. The chip-scale device 300 may include optical functions and components on a hybrid optical waveguide platform which combines the nonlinear properties of ppKTP waveguides (or other waveguides made from materials having similar properties) with the high confinement and filtering capabilities of silicon nitride waveguides.

In further embodiments, the chip-scale device 300 may generate a pump photon 308. From the pump photon 308, the chip-scale device 300 may generate a high flux of time-energy entangled twin-photons via continuous-wave (CW) pumped Type II degenerate spontaneous parametric down conversation (dSPDC) in a photon-providing waveguide (such as a ppKTP waveguide or waveguide made from similarly capable material. The twin-photon state (also known as the bi-photon state, or the "2002" state) may have robust time-spectral entanglement and is an ideal quantum system for synchronizing time between clocks on remote satellites, as it is not easily decohered due to absorption or loss, and the transmission channel (free space) is naturally free of dispersion.

In additional embodiments, the chip-scale device 300 may provide a hybrid waveguide platform that combines the nonlinear optical capabilities of the photons providing waveguides with the tight guiding and filtering capabilities of photonics-component waveguides. This combination permits miniaturization, efficiency, and robustness while increasing the useable flux of the twin-photons 306A and 306B (emitted from the chip-scale device as photons 303 and 305).

In certain embodiments, in the source path 301, twin-photons 306A and 306B are created via dSPDC in the photon-providing waveguide. Each of the twin photons 306A and 306B may occupy a different waveguide mode, either Transverse Electric (TE) or Transverse Magnetic (TM). A Vertical Coupler (VC) region may adiabatically draw the bi-photons out of the photon-providing waveguide into a photonics-component waveguide patterned on top of the photon-providing waveguide. Additionally, the TM and TE photons may be separated by two diffractive waveguide mode splitters (MS). The TE photon may then pass through a bandpass filter (BPF) to reject background photons, through a second MS, then leaves the chip as twin photon 305. Also, the original TM photon is converted into a TE mode by a diffractive mode converter (MC), which also reverses its direction of propagation. This (now TE polarized) photon passes through a BPF and leaves the chip as twin photon 303. The various functions performed on the chip may be performed by a photonics-component waveguide (in some embodiments, made from silicon nitride or other similar material), where waveguide structures are patterned in a film deposited on top of the substrate containing the photon-providing waveguide.

In additional embodiments, in the interferometer path 316, the twin-photons 303 and 305 may be reflected from the remote reflectors. The twin photons 303 and 305 may be recoupled into the photonics-component waveguides on the chip-scale device 300 to be provided to a HOM interferometer. (In some implementations, the photons may also have their polarizations rotated by 90 degrees by conventional waveplates). Although the twin photons 303 and 305 re-enter the same waveguides from which they were earlier emitted, because of their now rotated polarizations, they couple into the orthogonal waveguide mode (i.e., TM). Each of the twin photons 303 and 305 may then interact with an MS that reverses their respective direction of propagation within the waveguide, passing the twin photons 303 and 305 through reflection ports of a respective MS towards a 50/50 waveguide coupler, where coincident twin photons may recombine. The photons that fail to recombine may then pass out of the chip-scale device 300 for detection by photodetectors 321 and 323 and subsequent interferometry performed by the timing module 311. The chip-scale device 300 and components contained therein are described in greater detail in U.S. Non-Provisional application Ser. No. 16/803,841, filed Feb. 27, 2020, and titled "INTEGRATED PHOTONICS SOURCE AND DETECTOR OF ENTANGLED PHOTONS;" U.S. Non-Provisional application Ser. No. 16/803,820, filed Feb. 27, 2020, and titled "INTEGRATED PHOTONICS MODE SPLITTER AND CONVERTER;" and U.S. Non-Provisional application Ser. No. 16/803,831, filed Feb. 27, 2020, and titled "INTEGRATED PHOTONICS VERTICAL COUPLER," all of which are incorporated herein by reference.

Figure 4:
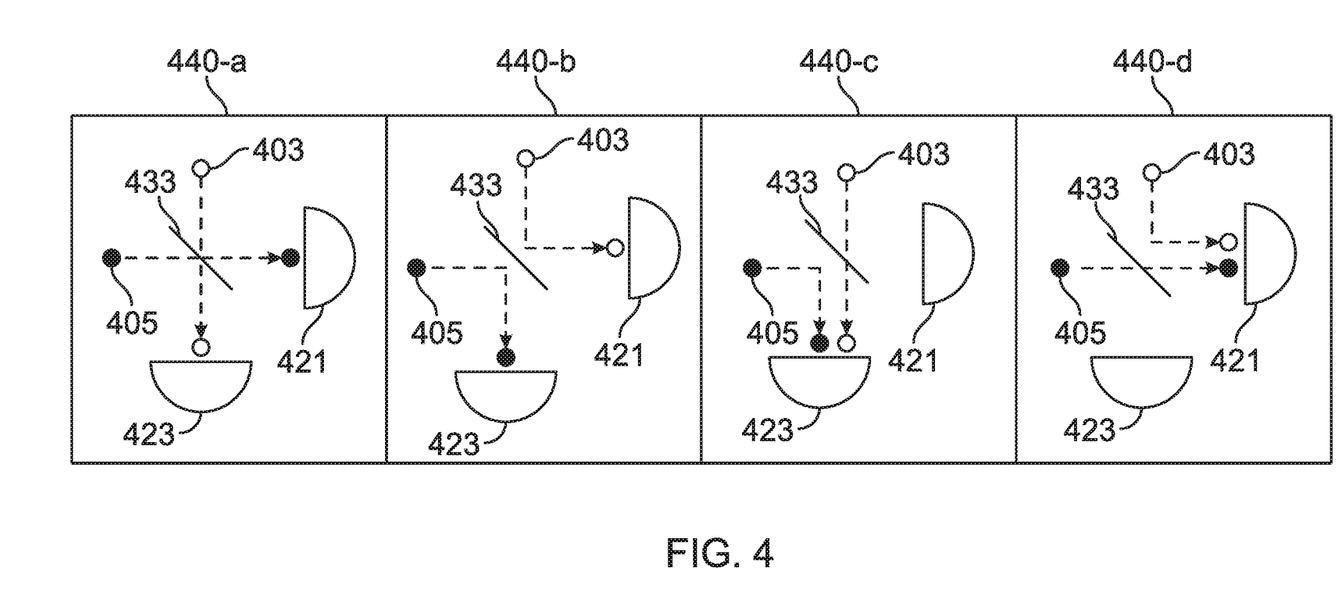
FIG. 4 is a diagram illustrating different optical paths for the reception of photon pairs according to an aspect of the present disclosure.

FIG. 4 is a diagram illustrating various combinations 440 in which twin photons 403 and 405 may be detected by photodetectors 421 and 423. Some systems may include a mode combiner 433 that directs twin photons 403 and 405 to one of two photodetectors 421 and 423, such as those found as part of the interferometer. In some embodiments, the first twin photon 403 may be described as a signal photon 403, and the second twin photon 405 may be described as an idler photon 405. As described above, the signal photon 403 may be projected along a first optical path, and the idler photon 405 may be projected along a second optical path. The first optical path may direct the signal photon 403 towards a first remote reflector, such as a satellite equipped with retro reflection optics, and the second optical path may direct the idler photon 405 towards a second remote reflector. Both the signal photon 403 and the idler photon 405 are reflected back towards the source and coupled into the mode combiner 433 (such as a 50/50 mode combiner described above as part of the optical source and receiver 206 in FIG. 2). As described above, a mode combiner 433 may have two output ports directed to two photodetectors 421 and 423. In some implementations, the photodetectors 421 and 423 may be single-photon avalanche photodetectors; however, other types of photodetectors may be used. The photodetectors 421 and 423 may provide electrical signals that are analyzed by a time difference counter, such as could be found as part of the timing module 213 in FIG. 2.

At times, the first optical path of the signal photon 403 may be shorter than the second optical path of the idler photon 405. Accordingly, the flight time of the signal photon 403 may be shorter than the flight time of the idler photon 405. At other times, the second optical path of the idler photon 405 may be shorter than the first optical path of the signal photon 403. Accordingly, the flight time of the idler photon 405 may be shorter than the flight time of the signal photon 403. When a flight time is shorter, the associated photon may be incident on one of the photodetectors 421 and 423 before the other photon is incident on one of the photodetectors 421 of 423. For example, when the flight time of the signal photon 403 is shorter than the flight time of the idler photon 405, the signal photon 403 will be incident on one of the photodetectors 421 and 423 before the idler photon is incident on one of the photodetectors 421 and 423. Conversely, when the flight time of the idler photon 405 is shorter than the flight time of the signal photon 403, the idler photon 405 will be incident on one of the photodetectors 421 and 423 before the signal photon 403.

When a signal photon 403 is incident on one of the photodetectors 421 and 423, the signal photon 403 may randomly be incident on one of the photodetectors 421 and 423. Similarly, when an idler photon 405 is incident on one of the photodetectors 421 and 423, the idler photon 405 may randomly be incident on one of the photodetectors 421 and 423. Accordingly, an associated signal photon 403 and idler photon 405 may be incident upon the photodetectors 421 and 423 in one of the combinations 440-a-440-d. As the signal photon 403 and the idler photon 405 are each randomly incident on the photodetectors 421 and 423, each of the combinations 440-a-440-d may substantially have a 25% chance of occurring.

In combination 440-a, the signal photon 403 and the idler photon 405 both pass through the mode combiner 433 and are incident on different photodetectors 421 and 423. Specifically, the signal photon 403 may pass through the mode combiner 433 and be incident upon the second photodetector 423 at a second photodetector detection time. The idler photon 405 may pass through the mode combiner 433 and be incident upon the first photodetector 421 at a first photodetector detection time. The photodetectors 421 and 423 may provide their signals to a timing module, where the signals contain information describing the first photodetector detection time and the second photodetector detection time. The timing module may calculate a time difference that is equal to the first photodetector detection time minus the second photodetector time.

In combination 440-b, the signal photon 403 and the idler photon 405 may both be reflected by the mode combiner 433 and are incident on different photodetectors 421 and 423. Specifically, the signal photon 403 may be reflected by the mode combiner 433 and be incident upon the first photodetector 421 at a first photodetector detection time. The idler photon 405 may be reflected by the mode combiner 433 and be incident upon the second photodetector 423 at a second photodetector detection time. The photodetectors 421 and 423 may provide their signals to a timing module, where the signals contain information describing the first photodetector detection time and the second photodetector detection time. The timing module may calculate a time difference that is equal to the first photodetector detection time minus the second photodetector time.

In combinations 440-c and 440-d, the signal photon 403 and the idler photon 405 may be incident on the same photodetector. For example, in combination 440-c, the signal photon 403 may pass through the mode combiner 433, and the idler photon 405 may be reflected by the mode combiner 433. Accordingly, both the signal photon 403 and the idler photon 405 are incident on the second photodetector 423. Alternatively, in combination 440-d, the signal photon 403 may be reflected by the mode combiner 433, and the idler photon 405 may pass through the mode combiner 433. Accordingly, both the signal photon 403 and the idler photon 405 are incident on the first photodetector 423. When the signal photon 403 and the idler photon 405 are incident on the same photodetector, a timing module may not receive separate signals from the first photodetector 421 and the second photodetector 423 from which to infer relative timing information.

As described above, when the signal photon 403 and the idler photon 405 arrive at different times, the combination 440-a may cause the timing module to measure the arrival time of the idler photon 405 minus the arrival time of the signal photon 403. Also, the combination 440-b may cause the timing module to measure the arrival time of the signal photon 403 minus the arrival time of the idler photon 405. The timing module may not acquire information from the combinations 440-c and 440-d. Accordingly, the measurements of the timing module may produce two clusters of results that are substantially equal in magnitude but opposite in sign, where the magnitude of the measurements is proportional to the difference in optical length between the paths.

Figure 5:
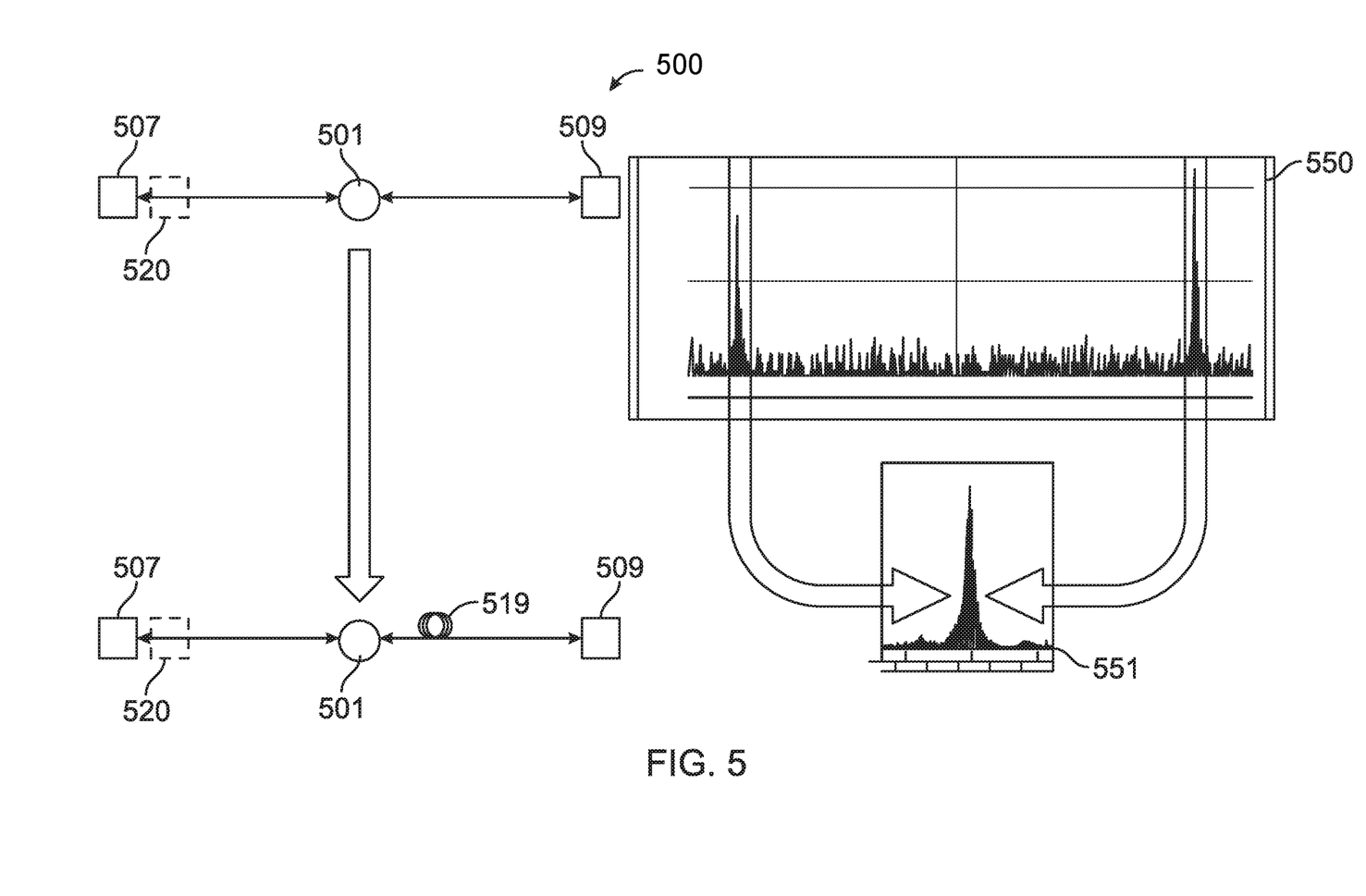
FIG. 5 is a diagram illustrating methods for adjusting optical paths having large delays according to an aspect of the present disclosure.

FIG. 5 is a block diagram of a system 500 for adjusting path lengths based on measurements from a timing module. As described above, the timing module may produce two clusters of results for the measurements of the time differences of the twin photons measured at the different photodetectors. The timing module may provide the results of the measurements to a processor that may perform a statistical analysis of the recorded time differences. The graph 550 is a histogram of the time differences measured by the timing module. The graph 550 shows two clusters of measurements that are substantially symmetric about the time of simultaneous arrival of the twin photons. The processor may perform a double peak fit or other mathematical process to extract a time delay from the histogram. The processor may use the extracted information to implement one or more adjustments to remove the time delay between the different optical paths of the twin photons such that the histogram of the results of the time differences measured by the timing module has a single cluster at the time of simultaneous arrival of the twin photons as shown in graph 551.

In certain embodiments, to implement the adjustment, the system 500 includes a photon source 501 that provides twin photons to remote reflectors 507 and 509. Specifically, the photon source 501 may provide a first photon to the remote reflector 507 and a second photon to the remote reflector 509. As shown, some unknown path length difference 520 may exist on the optical path of the first photon between the photon source 501 and the remote reflector 507. Due to the path length difference 520, the timing module on the photon source may measure a difference in the time that the first photon and the second photon are incident upon the photodetectors on the photon source. Accordingly, the processor may observe two clusters of measurements that are substantially symmetric about the time of simultaneous arrival. The processor may then extract the time delay from the measurements provided by the timing module. For example, the width between the clusters of measurements may be equal to twice the delay that results from the path length difference 520. The processor may then add a delay 519 to the shorter of the optical paths, such that the different optical paths between the photon source 501 and the remote reflector 507 and 509 are substantially equal. In some embodiments, the paths are substantially equal when the path length difference after the added delay 519 is within a fine adjustment range for adjustments performed by the adjuster 219.

In some embodiments, the processor may be able to calculate the magnitude of the delay but not the sign of the delay from the information provided by the timing module. To determine the sign of the delay (which optical path should be delayed through the insertion of an added delay 519), the processor may add the additional delay to one of the two optical paths between the photon source 501 and the two remote reflectors 507 and 509. After the additional delay 519 is added to one of the paths, the processor may again determine if the timing module measures a difference in the time of incidents. If the measurements provided by the timing module result in two clusters of measurements that are separated by twice the original delay that existed in the optical path before the addition of the delay 519, the processor may determine that the delay 519 was added to the wrong optical path. Accordingly, the processor may then remove the delay 519 and insert the delay 519 to the other optical path, such that the histogram of the results of the time differences measured by the timing module has a single cluster at the time of simultaneous arrival of the twin photons as shown in graph 551. Alternatively, if the measurements provided by the timing module result in a single cluster of measurements at the time of simultaneous arrival, the processor may determine that the delay 519 was added to the correct optical path.

In further embodiments, the delay 519 may be added as a series of discrete optical path lengths. For example, the system 500 may be capable of inserting large delays 519 into one or both of the optical paths. The delays 519 may be inserted using discrete optical delay elements of various lengths. For example, the delay element 519 may be any combination of optical fiber, mirrors, or other optical devices. Additionally, the delay element 519 may include insertable optical fiber sections having lengths of 100 m, 10 m, 1 m, 1 cm, etc. Also, the delay element 519 may include adjustable mirrors that can reflect light between the mirrors a desired number of times to delay light propagating therebetween as determined by the angle of the mirrors, where the angle of the mirrors relative to one another is controlled by the processor. Other delay elements may be used to control the length of the delay 519, such as piezoelectric transducers, adjustable prisms, and the like. As such, using various lengths of delay, the processor may remove the path length difference between the multiple optical paths such that the path length difference is within a fine adjustment range.

In certain embodiments, when the photon source 501 is moving relative to one or both of the remote reflectors 507 and 509, the processor may make adjustments to the delay 519 to keep the optical path lengths substantially equal. For example, if the processor determines that there is more than one cluster of measurements, the processor may adjust the length of the delay 519. Alternatively, the processor may adjust the delay 519 when the processor determines that the difference in the optical path length is greater than a fine adjustment range.

Figure 6:
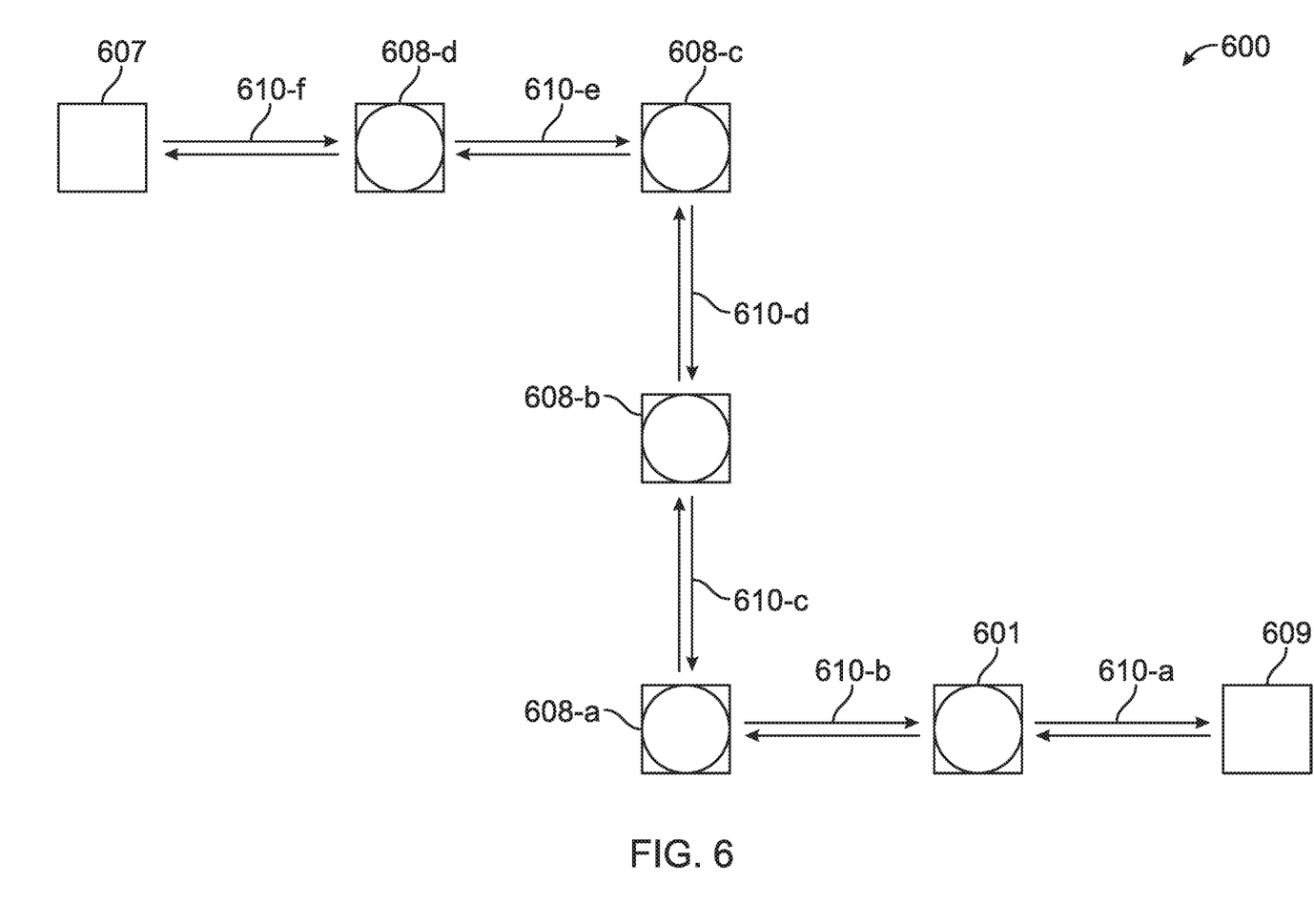
FIG. 6 is a block diagram illustrating a network of optical sources and remote reflectors according to an aspect of the present disclosure.

FIG. 6 is a block diagram of a network 600 of optical devices that implement the systems and methods described above to synchronize multiple systems in the network 600. As illustrated, the network 600 may include a first optical source 601. In certain embodiments, the first optical source 601 functions as an optical source that initializes synchronization of the various nodes of the network 600. As such, the first optical source 601 operates as a node in the network that functions solely as a source of entangled photon pairs and not solely as an endpoint for reflecting photons. In other embodiments, the first optical source 601 functions as both a source of entangled photon pairs and an endpoint for reflecting photon pairs. As such, the first optical source 601 functions as a multifunction node 601 that functions as both the endpoint and source of entangled photons. Additionally, the network 600 may include endpoint nodes 607 and 609, which function similarly to the remote reflectors described above. Further, the network 600 may include multifunction nodes 608-a-608-d (referred to generally and collectively as multifunction nodes 608) that function as both endpoints and sources of entangled photon pairs.

In certain embodiments, to begin synchronization, the first optical source 601 operating as a first multifunction node 601 may synchronize the optical path 610-a, between the first multifunction node 601 and the endpoint node 609, with the optical path 610-*b*, between the first multifunction node 601 and the multifunction node 608-*a*. The first multifunction node 601 may synchronize the optical paths 610-*a* with 610-*b* using combinations of the coarse adjustments described above and fine adjustments. When the optical path 610-*a* is synchronized with the optical path 610-*b*, the multifunction node 608-*a* may then act as an optical source using multifunction node 608-*b* and the first multifunction node 601 as a reflector to synchronize the optical path 610-*c* with the optical path 610-*b* substantially as described above. Similarly, multifunction node 608-*b* synchronizes the optical path 610-*d* with the optical path 610-*c*, the multifunction node 608-*c* synchronizes the optical path 610-*e* with the optical path 610-*d*, and the multifunction node 608-*d* synchronizes the optical path 610-*f* with the optical path 610-*e*.

Figure 7:
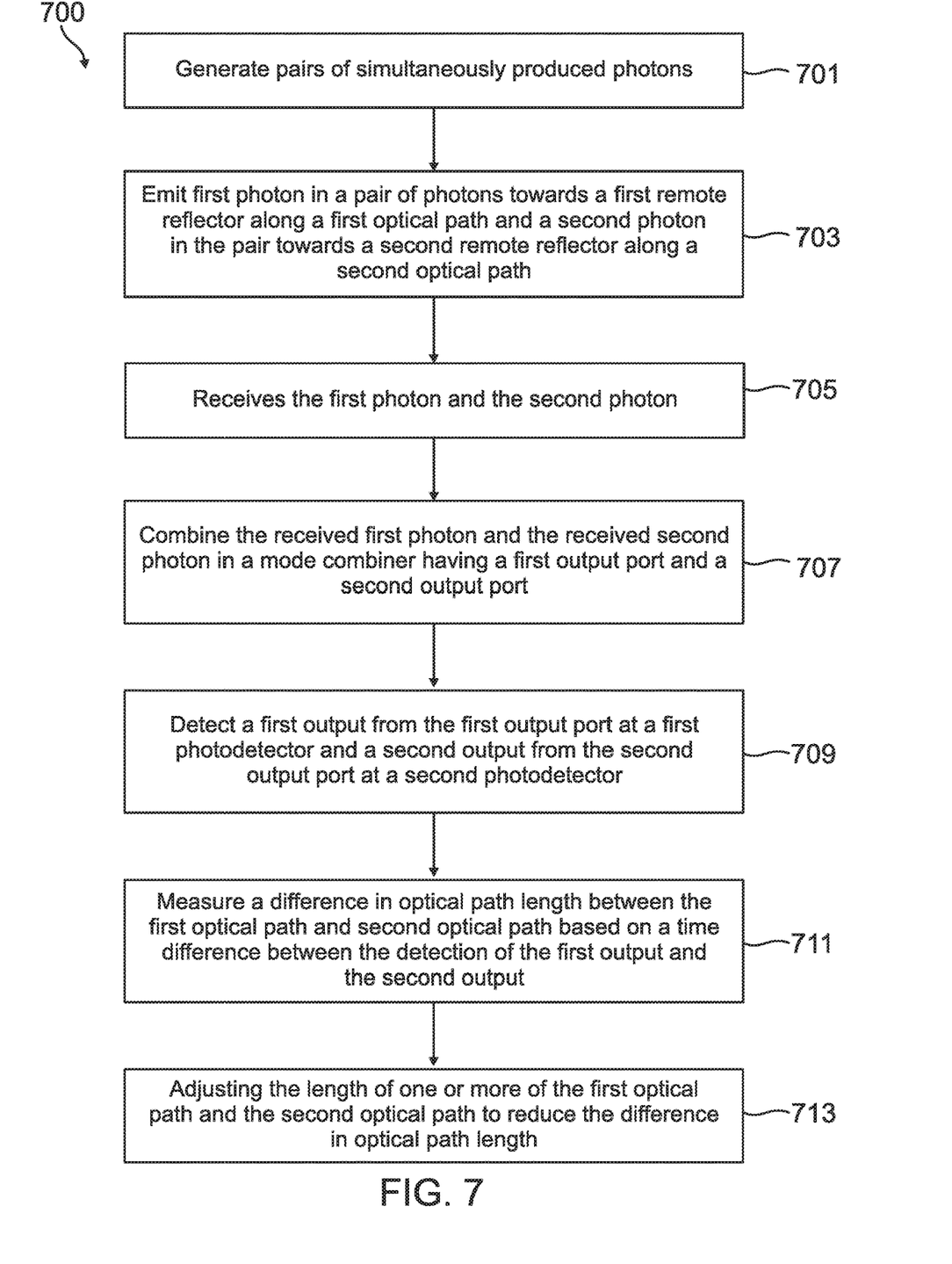
FIG. 7 is a flowchart diagram for dynamic optical interferometer locking using entangled photons according to an aspect of the present disclosure.

FIG. 7 is a flowchart diagram of a method 700 for directly measuring differences in optical path length between an optical source and to remote reflectors. For example, the method 700 proceeds at 701, where pairs of simultaneously produced photons are generated. Additionally, the method 700 proceeds at 703, where a first photon in a pair of photons is emitted towards a first remote reflector along a first optical path, and a second photon in the pair is emitted towards a second remote reflector along a second optical path. Also, the method 700 proceeds at 705, where the first photons and the second photons are received. Moreover, the method 700 proceeds at 707, where the received first photon and the received second photon is combined in a mode combiner having a first output port and a second output port.

In further embodiments, the method 700 proceeds at 709, where a first output from the first output port is detected at a first photodetector, and a second output from the second output port is detected at a second photodetector. Also, the method 700 proceeds at 711, where a difference in optical path length is measured between the first optical path and the second optical path based on a time difference between the detection of the first output and the second output. Additionally, the method 700 may proceed at 713, where the length of one or more of the first optical path and the second optical path may be adjusted to reduce the difference in optical path length.

EXAMPLE EMBODIMENTS

Example 1 includes a system comprising: an optical source for generating a pair of simultaneously produced photons; a first emitter/receiver that emits a first photon in the pair of photons towards a first remote reflector and receives the reflected first photon along a first optical path; a second emitter/receiver that emits a second photon in the pair of photons towards a second remote reflector and receives the reflected second photon along a second optical path; a mode combiner for combining the reflected first photon and the reflected second photon into a first output port and a second output port; a plurality of photodetectors that detect photons from the first output port and photons from the second output port; and a processor that executes executable code that causes the processor to measure a difference in time delay between the first optical path and the second optical path based on a time difference of arrival of signals from the plurality of photodetectors.

Example 2 includes the system of Example 1, wherein the executable code directs the processor to send commands to an actuator that causes the actuator to make adjustments to the length of one or more of the first optical path and the second optical path to reduce the difference in time delay.

Example 3 includes the system of Example 2, wherein the difference in time delay is reduced such that the difference is within a fine adjustment range.

Example 4 includes the system of any of Examples 2-3, wherein the adjustments to the length are substantially equal to a length associated with the measured difference in time delay.

Example 5 includes the system of any of Examples 2-4, wherein the executable code directs the processor to: command the actuator to insert a length of optical transmission media into the first optical path, wherein the length of optical transmission media is substantially equal to a length associated with the measured difference in time delay; measure a changed difference in time delay for the first optical path and the second optical path after the length of optical transmission media is inserted into the first optical path; determine whether the changed difference in time delay is greater than the measured difference in time delay; and when the changed difference in time delay is greater than the measured difference in time delay, command the actuator to remove the length of optical transmission media from the first optical path and insert the length of optical transmission media into the second optical path.

Example 6 includes the system of Example 5, wherein the optical transmission media comprises at least one of: a length of optical fiber; a plurality of reflective mirrors; and a mechanical delay stage.

Example 7 includes the system of any of Examples 5-6, wherein the optical transmission media comprises combinations of different combinable lengths of optical transmission media.

Example 8 includes the system of any of Examples 1-7, wherein the processor measures the difference in time delay by: constructing a histogram of time differences between when photons in the pair of photons are incident on a first photodetector in the plurality of photodetectors and when the photons are incident on a second photodetector in the plurality of photodetectors; and measuring a time delay as a time difference between a first peak and a second peak in the histogram.

Example 9 includes the system of Example 8, wherein the time difference between the first peak and the second peak is calculated using a double peak fit.

Example 10 includes a method comprising: generating pairs of simultaneously produced photons; emitting a first photon in a pair of photons in the pairs of simultaneously produced photons towards a first remote reflector and a second photon in the pair of photons towards a second remote reflector; receiving the first photon and the second photon, wherein the first photon and the second photon respectively traveled along a first optical path and a second optical path; combining the received first photon and the received second photon in a mode combiner having a first output port and a second output port; detecting a first output from the first output port at a first photodetector and a second output from the second output port at a second photodetector; and measuring a difference in optical path length between the first optical path and the second optical path based on a time difference between the detection of the first output and the second output by the first photodetector and by the second photodetector.

Example 11 includes the method of Example 10, further comprising adjusting the length of one or more of the first optical path and the second optical path to reduce the difference in optical path length.

Example 12 includes the method of Example 11, wherein adjusting the length comprises reducing the difference in optical path length to be within a fine adjustment range.

Example 13 includes the method of any of Examples 11-12, wherein adjusting the length comprises reducing the difference in optical path length by a discrete distance that is proximate to the measured difference in optical path length.

Example 14 includes the method of any of Examples 11-13, wherein adjusting the length further comprises: inserting a length of optical transmission media into the first optical path; measuring a changed difference in optical path length between the first optical path and the second optical path after the length of optical transmission media is inserted into the first optical path; determining whether the changed difference in optical path length is greater than the measured difference in optical path length; and when the changed difference in optical path length is greater than the measured difference in optical path length, removing the length of optical transmission media from the first optical path and inserting the length of optical transmission media into the second optical path.

Example 15 includes the method of Example 14, wherein the optical transmission media comprises at least one of: a length of optical fiber; a plurality of reflective mirrors; and a mechanical delay stage.

Example 16 includes the method of any of Examples 14-15, wherein the optical transmission media comprises combinations of different combinable lengths of optical transmission media.

Example 17 includes the method of any of Examples 10-16, further comprising: constructing a histogram of time differences of the detection of the first output and the second output; and measuring a time difference between a first peak and a second peak in the histogram; and identifying a length associated with the time difference.

Example 18 includes the method of Example 17, wherein measuring the time difference between the first peak and the second peak comprises using a double peak fit.

Example 19 includes a system comprising: an optical source for generating pairs of simultaneously produced photons; a first emitter/receiver that emits first photons in the pairs of simultaneously produced photons towards a first remote reflector and receives the reflected first photons along a first optical path; a second emitter/receiver that emits second photons in the pairs of simultaneously produced photons towards a second remote reflector and receives the reflected second photons along a second optical path; a mode combiner which combines the reflected first photons from the first optical path and the reflected second photons from the second optical path; a plurality of photodetectors that detect a first output from a first output port of the mode combiner and a second output from a second output port of the mode combiner; an actuator for controlling the lengths of the first optical path and the second optical path; and a processor that executes executable code that causes the processor to: measure a difference in optical path length between the first optical path and the second optical path based on a time difference between when associated photons in the pairs of simultaneously produced photons are incident on different photodetectors in the plurality of photodetectors; and send commands to the actuator that causes the actuator to make adjustments to the length of one or more of the first optical path and the second optical path to reduce the difference in optical path length.

Example 20 includes the system of Example 19, wherein the processor measures the difference in length by: constructing a histogram of time differences between when photons in the pairs of simultaneously produced photons are incident on a first photodetector in the plurality of photodetectors and when the associated photons are incident on a second photodetector in the plurality of photodetectors; and measuring a time difference between a first peak and a second peak in the histogram; and identifying a length associated with the time difference.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof

What is claimed is:

1. A system comprising:
    an optical source for generating a pair of simultaneously produced photons;
    a first emitter/receiver that emits a first photon in the pair of photons towards a first remote reflector and receives the first photon reflected by the first remote reflector, the first photon traveling along a first optical path;
    a second emitter/receiver that emits a second photon in the pair of photons towards a second remote reflector and receives the second photon reflected by the second remote reflector, the second photon traveling along a second optical path;
    a mode combiner for combining the reflected first photon and the reflected second photon into a first output port and a second output port;
    a plurality of photodetectors that detect photons from the first output port and photons from the second output port; and
    a processor that executes executable code that causes the processor to:
        measure a difference in time delay between the first optical path and the second optical path based on a time difference of arrival of signals from the plurality of photodetectors;
        send commands to an actuator that causes the actuator to insert a length of optical transmission media into the first optical path, wherein the length of optical transmission media is substantially equal to a length associated with the measured difference in time delay.

2. The system of claim 1, wherein the executable code directs the processor to send commands to the actuator that causes the actuator to make adjustments to a length of one or more of the first optical path and the second optical path to reduce the difference in time delay.

3. The system of claim 2, wherein the difference in time delay is reduced such that the difference is within a fine adjustment range.

4. The system of claim 2, wherein the executable code directs the processor to:
    measure a changed difference in time delay for the first optical path and the second optical path after the length of optical transmission media is inserted into the first optical path;
    determine whether the changed difference in time delay is greater than the measured difference in time delay; and
    when the changed difference in time delay is greater than the measured difference in time delay, command the actuator to remove the length of optical transmission media from the first optical path and insert the length of optical transmission media into the second optical path.

5. The system of claim 1, wherein the optical transmission media comprises at least one of:
   a length of optical fiber;
   a plurality of reflective mirrors; and
   a mechanical delay stage.

6. The system of claim 1, wherein the optical transmission media comprises combinations of different combinable lengths of optical transmission media.

7. The system of claim 1, wherein the processor measures the difference in time delay by:
   constructing a histogram of time differences between when photons in the pair of photons are incident on a first photodetector in the plurality of photodetectors and when the photons are incident on a second photodetector in the plurality of photodetectors; and
   measuring a time delay as a time difference between a first peak and a second peak in the histogram.

8. The system of claim 7, wherein the time difference between the first peak and the second peak is calculated using a double peak fit.

9. A method comprising:
   generating pairs of simultaneously produced photons;
   emitting a first photon in a pair of photons in the pairs of simultaneously produced photons towards a first remote reflector and a second photon in the pair of photons towards a second remote reflector;
   receiving the first photon and the second photon, wherein the first photon and the second photon respectively traveled along a first optical path and a second optical path;
   combining the received first photon and the received second photon in a mode combiner having a first output port and a second output port;
   detecting a first output from the first output port at a first photodetector and a second output from the second output port at a second photodetector; and
   measuring a difference in optical path length between the first optical path and the second optical path based on a time difference between the detection of the first output and the second output by the first photodetector and by the second photodetector;
   inserting a length of optical transmission media into the first optical path, wherein the length of optical transmission media is substantially equal to the difference in optical path length.

10. The method of claim 9, further comprising adjusting the length of one or more of the first optical path and the second optical path to reduce the difference in optical path length.

11. The method of claim 10, wherein adjusting the length comprises reducing the difference in optical path length to be within a fine adjustment range.

12. The method of claim 10, further comprising:
   measuring a changed difference in optical path length between the first optical path and the second optical path after the length of optical transmission media is inserted into the first optical path;
   determining whether the changed difference in optical path length is greater than the measured difference in optical path length; and
   when the changed difference in optical path length is greater than the measured difference in optical path length, removing the length of optical transmission media from the first optical path and inserting the length of optical transmission media into the second optical path.

13. The method of claim 9, wherein the optical transmission media comprises at least one of:
   a length of optical fiber;
   a plurality of reflective mirrors; and
   a mechanical delay stage.

14. The method of claim 9, wherein the optical transmission media comprises combinations of different combinable lengths of optical transmission media.

15. The method of claim 9, further comprising:
   constructing a histogram of time differences of the detection of the first output and the second output; and
   measuring a time difference between a first peak and a second peak in the histogram; and
   identifying a length associated with the time difference.

16. The method of claim 15, wherein measuring the time difference between the first peak and the second peak comprises using a double peak fit.

17. A system comprising:
   an optical source for generating pairs of simultaneously produced photons;
   a first emitter/receiver that emits first photons in the pairs of simultaneously produced photons towards a first remote reflector and receives the first photons reflected by the first remote reflector, the first photon traveling along a first optical path;
   a second emitter/receiver that emits second photons in the pairs of simultaneously produced photons towards a second remote reflector and receives the second photons reflected by the second remote reflector, the second photon traveling along a second optical path;
   a mode combiner which combines the reflected first photons from the first optical path and the reflected second photons from the second optical path;
   a plurality of photodetectors that detect a first output from a first output port of the mode combiner and a second output from a second output port of the mode combiner;
   an actuator for controlling lengths of the first optical path and the second optical path; and
   a processor that executes executable code that causes the processor to:
      measure a difference in optical path length between the first optical path and the second optical path based on a time difference between when associated photons in the pairs of simultaneously produced photons are incident on different photodetectors in the plurality of photodetectors; and
      send commands to the actuator that causes the actuator to make insert a length of optical transmission media into the first optical path, wherein the length of optical transmission media is substantially equal to the difference in optical path length.

18. The system of claim 17, wherein the processor measures the difference in length by:
   constructing a histogram of time differences between when photons in the pairs of simultaneously produced photons are incident on a first photodetector in the plurality of photodetectors and when the associated photons are incident on a second photodetector in the plurality of photodetectors; and
   measuring a time difference between a first peak and a second peak in the histogram; and
   identifying a length associated with the time difference.

* * * * *